United States Patent
Revill

(10) Patent No.: US 6,891,969 B2
(45) Date of Patent: May 10, 2005

(54) BITMAP GRAPHICS COMPRESSION FOR IMAGE DATA

(75) Inventor: Stephen Revill, Cambridge (GB)

(73) Assignee: Pace Micro Technology PLC, Shipley (GB)

(*) Notice: Subject to any disclaimer, the term of this patent is extended or adjusted under 35 U.S.C. 154(b) by 587 days.

(21) Appl. No.: 09/951,644

(22) Filed: Sep. 11, 2001

(65) Prior Publication Data

US 2002/0051568 A1 May 2, 2002

(30) Foreign Application Priority Data

Sep. 12, 2000 (GB) .............................. 0022250

(51) Int. Cl.[7] .................................................. G06K 9/00
(52) U.S. Cl. ...................................... 382/166; 382/232
(58) Field of Search ............................... 382/232, 166; 345/603, 835, 501, 506, 549; 358/1.15, 1.2; 375/240.24

(56) References Cited

U.S. PATENT DOCUMENTS

| 5,046,119 A | 9/1991 | Hoffert et al. ................ 382/56 |
| 5,471,248 A | * 11/1995 | Bhargava et al. ....... 375/240.24 |
| 5,625,759 A | 4/1997 | Freeman ..................... 395/114 |
| 5,798,753 A | * 8/1998 | Zhou et al. .................. 345/603 |
| 5,884,014 A | * 3/1999 | Huttenlocher et al. ..... 358/1.15 |
| 5,973,692 A | * 10/1999 | Knowlton et al. .......... 345/835 |
| 6,091,850 A | 7/2000 | Ostrovsky ................... 382/166 |

OTHER PUBLICATIONS

Kobayashi et al., "Lossless Compression for RGB Color Still Images", IEEE International Conference on Image Processing, Vo 4, Oct. 1999, pps. 73–77.*

* cited by examiner

Primary Examiner—Anh Hong Do
(74) Attorney, Agent, or Firm—Head, Johnson & Kachigian

(57) ABSTRACT

The invention relates to the provision of a graphic compression method for pixel data for a display screen and particularly a display screen provided as part of a mobile device. The method includes the splitting of pixels data for the display into quadratic groups of pixels typically 2×2 pixels, and by encoding representing the same with respect to a number of color templates, with a reduced number of bits.

6 Claims, 1 Drawing Sheet

= 0b100001

BITMAP GRAPHICS COMPRESSION FOR IMAGE DATA

CROSS-REFERENCE TO RELATED APPLICATION

This application claims priority to British Patent Application 0022250.5 filed 12 Sep. 2000.

BACKGROUND OF THE INVENTION

The invention to which this application relates is to the compression of data and in particular image data.

With the increasing use of mobile devices which may have a limited memory capacity and/or network bandwidth for receiving data, the compression of data is becoming increasingly important so that the same can be transmitted and received in a usable format.

A common way of providing indications or options or other information to a user of a device is to provide graphic symbols in addition to text or alternatively to text. However, the volume of data required for graphics can be extremely large, for example, a bitmap image can consist of many pixels and each pixel has an associated color and in modern applications the colors are typically defined from a palette of roughly 16 million available colors. If a bitmap image is 300 pixels wide and 300 pixels high this means that there are 90,000 pixels, each of which may require up to four bytes of color information which can give an image which has 360,000 bytes or 352 KB in size.

Some prior art which is already known is disclosed in U.S. Pat. Nos. 6,091,850 and 5,625,759 which are largely concerned with solving the problem of optimal palette selection. The compression is a side-effect of this process. They do also specify compression techniques, but both patents attempt to compress a bitmap graphic image by analyzing both the shapes and colors in that image and this is largely true of any graphics compression method. Furthermore both patents suggest ways of improving the compression ratio using techniques such as run-length encoding and observe that small groups of pixels can have their color depth reduced to one or two colors in normal images without the results being too detrimental. The present invention aims to improve on these methods by providing a graphics compression method which, when used, can reduce image sizes by a significant amount.

SUMMARY OF THE INVENTION

In a first aspect of the invention there is provided a method for the compression or reduction of data relating to a graphic image for generation on a display screen said method comprising splitting the pixels required for the graphical image into quadratic groups of pixels and then, with reference to each group of four pixels, representing the same with reference to one of one or two color templates, and then allocating appropriate identification for the selected one of the templates in an encoded format, for the group of four pixels.

In a preferred embodiment reference is made to eight one or two color templates one of which is selected and for which the generation of the bits to represent the quadratic group is preferred. The group is preferably a square group of four pixels.

Typically, for each group of four pixels, the method analyses the similarity between each color to the other three colors in the group. This therefore means that there are six color comparisons required to be undertaken for each group of four pixels.

Typically the method distinguishes between groups of a uniform color and groups with more than one color.

Thus in this invention it is possible in small pixel groups of 2×2 pixels, rather than conventional 4×4 groups, to describe virtually all combinations of pixels in a picture using just two colors without any noticeable loss of color by the human eye.

When the comparison has been obtained and the six results obtained these can be compared against a threshold value which determines which of the templates from the eight color template is best suited. When determined for each of the six comparisons, the appropriate template can be represented by three bits.

In a further feature of the invention any two color group of 2×2 pixels can be represented using one of only seven color templates and so, in turn can be encoded in three bits. Typically the eighth color template is used for one or single color groups of pixels.

In one embodiment a further bit is required to indicate the polarity of the template.

As the method works on smaller groups of pixels than conventional methods it does not require an anti-aliasing mode. This saves on the required flags overhead, at the expense of storing more templates. That is no loss as the provision of four, three bit templates still requires 25% less bit processing than one 16 bit bitmap which is conventionally used by analysing 4×4 pixel blocks.

Thus, with the method outlined, it is possible to compress data related to an image by around 50% and this can be improved significantly further by reducing the color depth of the palette, by computing an optimal palette for the compressed image or by employing the run-length encoding or a similar scheme on the colors for each template.

BRIEF DESCRIPTION OF THE DRAWING

A specific embodiment of the invention is now described with reference to the accompanying figures wherein.

DESCRIPTION OF THE PREFERRED EMBODIMENTS

Figure 1A:
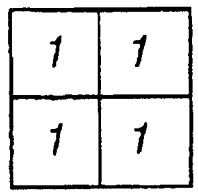
FIGS. 1A–H illustrate the eight color templates which are used in one embodiment of the method.
Figure 1B:
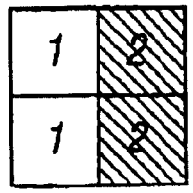

The method of the invention provides for the measurement of how close each color is to the others. This can be done using six applications of a trigonometric function (based on a 3D version of Pythagoras's function for calculating the length of the hypotenuse of a right-angled triangle from the opposite and adjacent side lengths):

$$d = (RED_a - RED_b)^2 + (GRN_a - GRN_b)^2 + (BLU_a - BLU_b)^2$$

This function computes d, the square of the distance between the two colors (a and b) given the red, green and blue components of their color (assuming an RGB RED, GREEN, BLUE color model).

The distance between each color can be obtained by calculating the square-root of d, but this is an expensive computation not required for the algorithm, so it is not performed, in this embodiment. Also, each component is preferably weighted to match the relative sensitivity of the human eye to that component.

For other linear color models (eg: Cyan, Magenta, Yellow, Black CMYK), the function above requires a value for the number of components changing (eg: make it four-dimensional for CMYK).

The six comparisons required in accordance with the invention and with reference to the group of pixels in accordance with FIG. 2 which shows a group of four pixels, 1, 2, 3, 4 are as follows:

1. Compare the color of pixel 1 with the color of pixel 2;
2. Compare the color of pixel 1 with the color of pixel 3;
3. Compare the color of pixel 1 with the color of pixel 4;
4. Compare the color of pixel 2 with the color of pixel 3;
5. Compare the color of pixel 2 with the color of pixel 4;
6. Compare the color of pixel 3 with the color of pixel 4.

With the results of these comparisons, it is possible to tell how close the color of each pixel in the group is to every other pixel's color.

With this information, the six d values are compared against a threshold value, t. This threshold defines what value of d is considered to be 'close', thus:

$d_1 <= t;$
$d_2 <= t;$
$d_3 <= t;$
$d_4 <= t;$
$d_5 <= t;$
$d_6 <= t$

The result for each test can be considered as a single bit; set if TRUE and clear if FALSE. All six bits can be combined to give a six bit field (ie: a number in the range 0 to 63).

For each value of the six bit field, we 'know' which template fits best, if any. As an example, the value 0b000000 indicates that all pixel colors are further from each other than the threshold value. No template fits well with this combination.

Figure 1C:
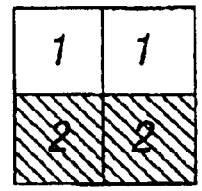
Figure 1D:
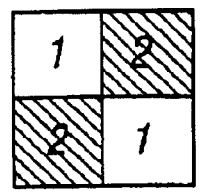
Figure 1E:
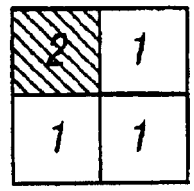
Figure 1F:
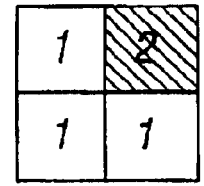
Figure 1G:
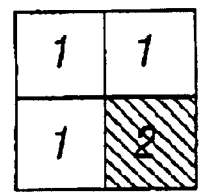
Figure 1H:
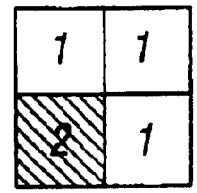
Figure 2:
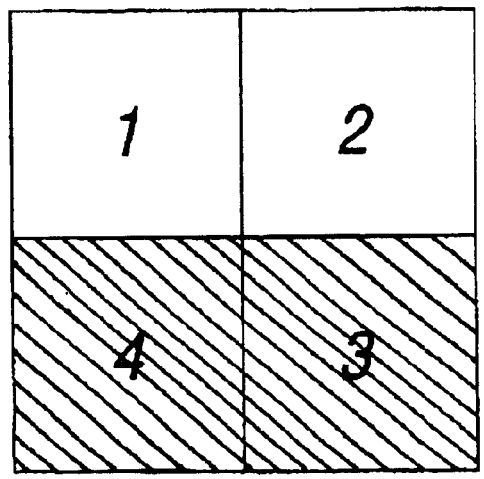
FIG. 2 illustrates a pixel group of four pixels as used in accordance with the invention.

In this example, the value attributed to the group of four pixels of FIG. 2 is the value 0b100001 which indicates that the colors of pixels 1 and 2 are at least as close as the threshold, as are the colors of pixels 3 and 4. The colors of pixels 1 and 2 are further than the threshold from those of pixels 3 and 4. This theirfore indicates that the template shown in FIG. 1C having two horizontal bands is a good fit.

Value 0b110000 is ambiguous; it could be template 8, but the colors of pixels 2 and 3 are further from each other than the threshold.

For every possible value (0 to 63) of the bit field, we can decide to either select a template for the pixels based on what is known about the value, or we can increase the threshold value by some amount (ie: a small amount when the template is slightly ambiguous or a large amount if no template fits) and repeat the process from the six d value comparisons to construct a new bit field. Eventually, a template will fit, but the loss of information increases with t.

When one of the templates shown in FIGS. 1A–1H is chosen, the color(s) for it may be derived by averaging the pixel color for each subgroup, '1' or '2' (shaded), possibly including error diffusion. The bits required can then be allocated and encoded and so the reduction in data is achieved. Template 1A is used for a single or one color group of pixels with templates 1B–H used and selected as appropriate for 2 color groups of pixels.

To further illustrate the advantages of the invention of a mathematical comparison with the method of U.S. Pat. No. 5,046,119 is now described.

Given a simple example a (noisy) image of 16 by 16 pixels, giving a total of 256 pixels is used.

The method in patent U.S. Pat. No. 5,046,119 would require 16*64=1024 bits to encode the image.

The invention of the method requires 64*(2+16)=1152 bits for the same image (assuming, that the colors are encoded into eight bits). This is a cost of an extra 128 bit (12.5%) to encode four times the color information.

However, if the method in patent U.S. Pat. No. 5,046,119 is applied to blocks of 2 by 2 pixels, without anti-aliasing (it is of no use on such small blocks), to give a more similar comparative resolution to that achieve in the invention, it would require 64*(32+4)=2304 bits.

This is 1152 bits (50%) more than required by the method of the current invention.

Even if the pixel depth of the colors store in the prior art encoding scheme were reduced to 8 bits per color (i.e. the proposed scheme in the US patent is modified), the image would require 64*(2+4+16)=1408 bits.

This is still 256 bits (18%) more than the method of the invention.

Note: (noisy) in this case is defined as each pixel in the source image having a wide and random distribution in color space when compared against other pixels in the image.

It should be appreciated that the method of the embodiment as herein described is provided for illustrative purposes only and therefore should not be interpreted as the only method which can be followed in accordance with the invention.

Thus the conventional methods are inherently more complex computationally than that of the current invention. This is an important consideration on most modern devices, where decompression speed is a key factor in the acceptance of a compression standard.

Furthermore, the method of the current invention will produce better quality output; as the smaller pixel group size allows finer detail to be preserved in the output image. It will also avoid the blurring effect inherent in anti-aliasing.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full ranger of equivalency to which each element thereof is entitled.

What is claimed is:

1. A method for the compression or reduction of data relating to a graphic image for generation on a display screen, said method comprising the steps of: splitting the pixels required for the graphical image into quadratic groups of pixels and then, with reference to each group of four pixels, representing the same with reference to one of a number of one or two color templates, and then allocating appropriate identification for the selected one of the templates in an encoded format, for the group of four pixels.

2. A method according to claim 1 wherein reference is made to eight one or two color templates, one of which is selected, for the generation of the bits to represent said quadratic group.

3. A method according to claim 1 wherein for each group of four pixels, the method analyzes and compares the similarity between the color of each pixel to the color of the other three pixels in the group.

4. A method according to claim 1 wherein when the comparison has been obtained for each of the pixels in the group these are compared against a threshold value which determines which of the templates from the eight color template is best suited.

5. A method according to claim 4 wherein when the best suited template is determined which best matches each of the color comparisons, the appropriate template can be represented by three bits.

6. A method according to claim 1 wherein each quadratic group is a square group of four pixels.

* * * * *